Aug. 4, 1936.   G. L. DAVIES   2,050,165
ELECTROMECHANICAL FREQUENCY SELECTOR
Filed Nov. 21, 1933
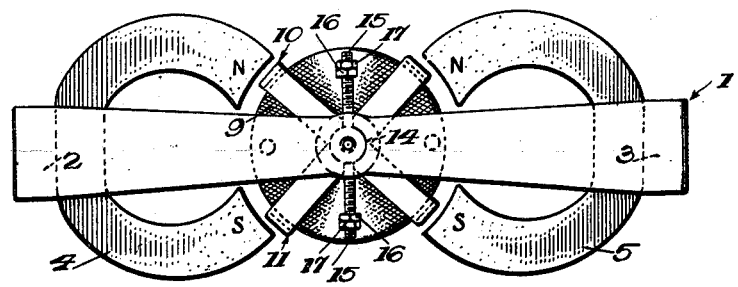
Inventor
Gomer L. Davies
By Samuel Scrivener Jr.
Attorney Patented Aug. 4, 1936

2,050,165

UNITED STATES PATENT OFFICE 2,050,165

ELECTROMECHANICAL FREQUENCY SELECTOR

Gomer L. Davies, Washington, D. C., assignor to Washington Institute of Technology, Inc., Washington, D. C., a corporation of Delaware Application November 21, 1933, Serial No. 699,052

21 Claims. (Cl. 171—123)

The present invention relates to electro-mechanical frequency selectors and the adaptation of improved devices of this type to various uses.

It has heretofore been proposed to provide devices comprising a vibrating reed which, when tuned mechanically to a certain frequency may be caused to vibrate at that frequency by the field of an electromagnet energized from a source of alternating current of an equal frequency. The tuned reed, vibrating at the selected frequency, is so mounted that such vibratory movement is caused to generate an alternating voltage in the windings of a second electromagnet in the field of which the reed vibrates. It will be apparent that the amplitude and frequency of the alternating voltage generated in the second winding will be equal or in proportion to the amplitude and frequency of that delivered to the driving coil. It has further been proposed to provide two devices of this type, the same being mechanically tuned to different frequencies, and the driving coils thereof being supplied with alternating currents having frequencies which are respectively equal to the natural mechanical frequencies of the tuned reeds. It will be apparent that variations in the energizing voltages will result in variations of the amplitudes of vibration of the tuned reeds, thereby causing variations in the generated voltages, and it has been found that such variations in the generated voltages may be employed for various useful purposes, such, for example, as course finding.

In the use of constructions such as described above on moving vehicles, such as aircraft, for course-finding or other purposes, it has been found that the reed converters and filters as described hereinbefore require the provision of shock mountings in order to isolate the vibrating assembly from the vibration of such vehicle. It has also been found that the stiffness and mass of the shock mounting seriously affect the characteristics of the translatory vibrating element. Because of such disadvantages and defects, the electro-mechanical filters developed to date have not proved to be entirely satisfactory.

It is therefore proposed by the present invention to provide an electro-mechanical frequency selector which will employ means having a rotary type of vibration and which will not be subject to certain of the disadvantages and restrictions of the usual, described type of converters and filters.

It is an object of the invention to provide an electro-mechanical frequency selector which will be highly selective, whereby only a current of pre-selected frequency, corresponding to the natural or pre-selected mechanical frequency of the vibrating assembly, will cause operation of the device.

A further object is to provide an electro-mechanical frequency selector of the rotary type, which will include means for adjusting the rotary inertia of the vibratory system, whereby the device may be easily tuned to a pre-selected frequency.

A further object is to provide an electro-mechanical frequency selector of the rotary type which will include means for preventing undesired radial vibrations of the oscillatory elements.

A still further object is to provide a frequency selector which will have obvious advantages in weight and size in comparison to similar devices heretofore employed, and which may be constructed by simple means, but which is designed to provide a strong and durable structure.

Other objects and features of novelty will be apparent from the following description and the drawing, it being expressly understood, however, that the invention is in no way limited by such description and drawing or otherwise than by the appended claims.

Referring to the drawing, in which similar reference numerals refer to like parts:

Fig. 1 is an end view of a device according to the present invention;

Fig. 2 is a plan view of the device disclosed in Fig. 1;

Fig. 3 is a view showing a circuit in which the device according to Figs. 1 and 2 may be employed, and Fig. 4 is a view showing a radio course finder system employing frequency selectors according to the present invention.

The present invention contemplates the provision of an electro-mechanical frequency selector of a novel type and, referring to Figs. 1 and 2 of the drawing, it will be seen that such device comprises a non-magnetic frame or support I which is illustrated as having a rectangular shape, although it will be apparent that any suitable shape or form for this frame may be employed. Carried by the opposite members 2, 3 of the frame I are a pair of permanent magnets 4, 5 having pole pieces so arranged that a cylindrical member may be disposed therebetween. Rigidly mounted in the opposite members 6, 7 of frame I are the ends of a shaft 8, which may be formed of any suitable material, although it has been found that alloys such as elinvar offer certain advantages. It will be noted that shaft 8 is so mounted that it extends centrally between the pole pieces of the magnets 4, 5. Carried by the shaft and rigidly attached thereto are a pair of coils 10, 11 which are so wound that they present longitudinal portions extending parallel to the shaft 8 and disposed adjacent the pole faces of the magnets 4, 5, and end portions at right angles to each other and at right angles to the shaft 8, whereby the coils may be said to be wound at 90° to each other. It is also contemplated by the invention that instead of one continuous shaft as shown, a pair of axially aligned shafts may be employed, each of the same having one end rigidly attached to frame 1 and the other end rigidly attached to the coil assembly at the junctures of the ends of the coils thereof.

Disposed within the coils 10, 11 and loosely surrounding the shaft 8 is a cylindrical core piece 9, preferably formed of soft iron, the outer face of which is adjacent the inner faces of the coils 10, 11. The core piece 9 may be supported rigidly on the frame 1 by means of non-magnetic bars or rods, although any suitable means for rigidly supporting the core piece on the frame 1 may be employed. It is also contemplated by the present invention that the core piece may be supported on shaft 8 although this is not the preferred embodiment.

Suitable leads 12, 13 are extended from coils 10, 11 for making electrical connections thereto, and such leads may be extended along or through the shaft or shafts 8, the latter construction being preferred and being disclosed in the drawing.

Means are provided by the invention for adjusting the rotary inertia of the assembly described, and such means comprise hub or collar member 14, rigidly attached to shaft 8 adjacent the juncture thereof with the coils 10, 11 and having a plurality of radially-extending pins or shafts 15 extending therefrom and preferably disposed at 180° to each other, although other arrangements of such pins or shafts may be employed. The said pins or shafts 15 are screwthreaded throughout their length to receive tuning nuts 16 which may be adjusted longitudinally of the shaft and locked in desired position by lock nuts 17. If desired, the tuning nuts 16 may be of the split, self-locking type, in which case no lock nuts will be required. It will be obvious that by proper adjustment of these devices the rotary assembly may be balanced centrifugally, and tuned to the desired frequency of vibration.

Means are also provided by the invention for preventing or damping any radial vibrations which may be set up in the rotary assembly described. Such means comprise the brackets 18 which are preferably mounted on the frame members 6, 7 adjacent the rigid connections between the shaft 8 and such frame members. Such brackets are preferably of cylindrical shape and are provided at their inner, facing ends with inwardly-turned flanges 19 which surround the shaft 8. The flanges 19 may be provided with bearing members 20 of rubber, felt or other suitable material which closely surround, without normally bearing on, the shaft 8 to thereby damp out or prevent undesired radial vibrations of the rotary assembly.

In the operation of the device described hereinbefore, it is contemplated that one of the coils 10, 11 shall be energized from a source of alternating current and for purposes of illustration, it will be assumed that the coil 10 is to be so energized through leads 12. Alternating current passing through coil 10 will cause a circumferential deflection of the coil assembly and shaft 8, due to the fact that the coil 10, through which current is passed, is disposed within the field of magnetic devices 4, 5. Such deflection of the rotary parts will be of the order of only a few degrees of arc, and due to the pulsating character of the current impressed across driving coil 10, and due also to the rigid connection between shaft 8, on which the coils are mounted, and the frame 1, the rotary parts will be alternately moved through a few degrees of arc and returned to normal position. It will be apparent that such vibratory movement of the rotary parts will become appreciable only when the frequency of the alternating current impressed across the driving coil is approximately equal to the natural mechanical frequency of the rotary assembly.

The response of the coil assembly to a driving current is dependent both on the frequency of alteration of the driving current and upon the magnitude of this current. The coil assembly will respond energetically only to frequencies in a very limited range which includes the natural frequency of the vibrating system, and will respond most readily to a driving current having a frequency very nearly equal to the natural frequency of the mechanical system, the response falling off rapidly as the frequency of the driving current departs from the natural frequency of the vibrating system.

Mathematically, the amplitude of vibration is directly proportional to the magnitude of the current in the driving coil, and is approximately inversely proportional to $F^2-f^2$, where $F$ is the frequency of the driving current and $f$ the natural frequency of the mechanical system. The ratio $$\frac{F-f}{F}$$

cannot be appreciably greater than 0.02 in order to secure a reasonable response by the vibrating system. It will therefore be obvious that the range of frequencies over which the device responds is only a small proportion of the natural frequency of the vibrating system.

The rotational vibrations of coils 10, 11 and shaft 8, described hereinbefore, cause the coil 11 to vibrate in the magnetic field set up by the permanent magnets 4, 5. Such movement of the coil in the magnetic field will, in accordance with well-known principles, cause the generation of an alternating voltage in the coil 11 which may be delivered to leads 13, 13. It will be apparent that the voltages generated in coil 11 will be proportional to the voltages delivered to the driving coil 10, due to the fact that the amplitude of the vibratory movement will be proportional to the voltages delivered to the exciting coil and that such amplitude will determine the value of the generated voltages.

It will be apparent that the dimensions and specifications of the rotary parts of the above-described device may be so designed as to provide a structure having any desired period of vibration. The characteristics of the instrument may also be varied by adjustment of the nuts 16, 17 which may also be adjusted to completely balance the rotary system. In view of this, it will be obvious that an instrument of this type may be designed and tuned to have a natural frequency of vibration equal to the frequency of a source of alternating current with which it is desired to employ the present structure.

In Fig. 3 of the drawing is disclosed a conventional arrangement of the device which may be employed when it is desired to use the same as an electro-mechanical frequency selector. It will be seen that the driving coil 10 is connected across a source of alternating current by leads 12, while the generating coil 11 is connected to an output circuit through leads 13.

The present invention also contemplates the provision of a course-indicating system for aircraft, such system embodying the electromechanical filter described hereinbefore. Referring to Fig. 4 it will be seen that two electro-mechanical filters 25, 26 have been provided, the same being constructed according to the present invention. The rotary elements of the two frequency selectors will have natural frequencies of vibration equal to frequencies to be selected. For example, frequency selector 25 may have a natural frequency of 65 cycles, while frequency selector 26 may have a natural frequency of 87 cycles. It will be apparent that vibrations will be set up in each frequency selector only when alternating voltages having frequencies equal, or nearly equal to the respective natural frequencies of the frequency selectors are impressed across the driving coils thereof. The driving coils 27, 28 of the two frequency selectors may be connected in series or parallel to the output terminals 29 of the usual aircraft radio receiving apparatus 40.

The electro-mechanical frequency selectors 25, 26 include the generating coils 30, 31 respectively, and the terminals of each of such generating coils are connected respectively to the input terminals of rectifiers 32, 33, these devices being of any usual and well-known type. The output terminals of the rectifiers are connected to the opposite terminals of a course indicating device 34 through leads 35, 36, the lead 36 including a resistance 37 to which the lead 36 is tapped. A volume indicator 38 of usual type is shunted across the resistance 37.

In the operation of the above-described course-indicating device, the driving coils 27, 28 of the electro-mechanical frequency selector devices 25, 26 are supplied with alternating currents from the output circuit of the radio receiving device. As described hereinbefore each of the electro-mechanical frequency selector devices is designed and adjusted to have a desired natural frequency of vibration, and a rotary vibratory movement will therefore be set up in each of such devices if alternating currents of approximately corresponding frequencies are supplied to the driving coils thereof by the radio receiver output circuit. As also descrbed herein-before alternating voltages will be generated in the generating coils 30, 31 due to such rotary vibratory movement, and the generated voltage in each generating coil will be proportional to the voltage supplied to the corresponding driving coil and having a frequency equal, or nearly equal to the natural frequency of the frequency selector device. For example, if the device 25 has a natural frequency of vibration of 65 cycles, a rotary vibratory movement will be set up in such device if an alternating current having a frequency of approximately 65 cycles is supplied to driving coil 27, and the induced voltage in generating coil 30 will be proportional to the voltage of the 65 cycle frequency supplied to such driving coil. If, at the same time, the device 26 has a natural frequency of vibration of 87 cycles, a rotary vibratory movement will be set up in such device if an alternating current having a frequency of approximately 87 cycles is supplied to the driving coil 28, and the induced voltage in generating coil 31 will be proportional to such supplied voltage.

The induced voltages from generating coils 30, 31 are now supplied to the input terminals of the rectifiers 32, 33 and the direct current taken from such rectifiers is supplied to opposite terminals of the course indicating device. It will be apparent that, if the 65 cycle and 87 cycle currents supplied to the respective driving coils are equal in amplitude, the voltages generated in the generating coils will be equal and consequently the direct currents supplied to the opposite terminals of the course-indicating device will be equal and an on-course indication will be given. If, however, one or the other of such supplied frequencies is greater than the other, equal voltages will not be induced in the generating coils and therefore equal voltages will not be supplied to the opposite terminals of the course-indicating device, whereby an off-course indication will be given.

While certain embodiments of my invention have been described and illustrated, it will be apparent to those skilled in the art that other embodiments of the invention may be practised, or changes made therein, without departing in any way from the spirit of the invention, for the limits of which reference must be had to the appended claims.

What is claimed is:

1. A frequency selector comprising a support, a member rigidly attached at its ends to said support, means for causing rotary vibratory movement of the portion of said member intermediate said fixed ends, and means carried by said member intermediate said fixed ends and operable to generate an alternating current during said rotary vibratory movement.

2. A frequency selector comprising a support, means associated with said support for setting up a magnetic field, a member having at least one of its ends rigidly fixed to said support and having another portion disposed in said magnetic field, means carried by said member and operable with said magnetic field for causing rotary vibratory movement of the portion of said member disposed in said magnetic field, and means carried by said member and operable with said magnetic field to generate an alternating current during said rotary vibratory movement.

3. A frequency selector comprising a support, means associated with said support for setting up a magnetic field, a shaft attached to said support and comprising a portion capable of rotation through a limited arc only, a driving coil connected to said shaft and disposed in said magnetic field, and a generating coil connected to said shaft and disposed in said magnetic field.

4. A frequency selector comprising a support, means associated with said support for setting up a magnetic field, a member rigidly attached at its ends to said support and disposed in said magnetic field, means co-operating with said magnetic field for causing rotary vibratory movement of the portion of said member intermediate said fixed ends, and means carried by said member intermediate said fixed ends for generating a voltage during said rotary vibratory movement.

5. A frequency selector comprising a magnet, a member having its ends fixed against rotary movement, a plurality of coils rigidly connected together and to said member intermediate the ends thereof and disposed in the field of said magnet, means for supplying current to one of said coils to cause rotary vibratory movement of said coils and the intermediate portion of said member, and means for taking alternating current from another of said coils during said rotary vibratory movement.

6. A frequency selector comprising a support, means associated with said support for setting up a magnetic field, a member having its ends attached to said support, a plurality of coils rigidly connected to said member intermediate the ends thereof and disposed in said magnetic field, said coils and the intermediate portion of said member forming an assembly having a pre-determined natural frequency of rotary vibration, means for preventing rotation of said assembly through more than a limited arc, means for supplying alternating current to one of said coils whereby said assembly will be caused to assume rotary vibratory movement when an alternating current having a frequency approximately equal to the natural frequency of vibration of said assembly is supplied to said one coil, another of said coils being adapted to generate an alternating current when vibrated in said magnetic field.

7. A frequency selector comprising a support, means associated with said support for setting up a magnetic field, a member attached to said support and comprising a portion capable of rotary movement through a limited arc only, a coil carried by said portion of said member and disposed in said magnetic field and operable to cause rotation of said portion of said member through a limited arc, and a second coil carried by said member and disposed in said magnetic field and operable to generate a current during said limited rotary movement.

8. A frequency selector comprising a support, means associated with said support for setting up a magnetic field, a member having its ends rigidly fixed to said support, the intermediate portion of said member between its ends being capable of rotary movement through a limited arc, means connected to the intermediate portion of said member and disposed in said magnetic field and operable to cause rotation of said member through a limited arc, and other means connected to the intermediate portion of said member and disposed in said magnetic field and operable to generate a current during such limited rotary movement.

9. A frequency selector comprising a shaft, a plurality of coils mounted on the intermediate portion of said shaft, said coils and the intermediate portion of said shaft comprising an assembly capable of rotary oscillatory movement and having a pre-determined natural frequency of rotary oscillation, means for preventing rotational movement of said assembly through more than a limited arc, means for setting up a magnetic field around said coils, and means for supplying alternating current to certain of said coils whereby said assembly will be caused to oscillate in said magnetic field when an alternating current having a frequency approximately equal to said pre-determined natural frequency is supplied to certain of said coils, certain of said coils being adapted to generate a current during said oscillatory movement.

10. A frequency selector comprising a support, means associated with said support for setting up a magnetic field, a shaft having its ends rigidly attached to said support, the intermediate portion of said shaft being capable of rotary movement through a limited arc only, a core member attached to said support and surrounding said shaft and disposed in said magnetic field, a driving coil attached to said shaft and surrounding said core member and being disposed in said magnetic field, and a generating coil attached to said shaft and surrounding said core member and being disposed in said magnetic field.

11. A frequency selector comprising a support, means associated with said support for setting up a magnetic field, a shaft attached to said support, a core member surrounding said shaft and disposed in said magnetic field, said core member being fixed against rotary movement, means attached to said shaft and surrounding said core member and being disposed in said magnetic field for causing rotary movement of said shaft, and other means attached to said shaft and surrounding said core member and being disposed in said magnetic field for generating a current during said rotary movement.

12. A frequency selector comprising a support, means associated with said support for setting up a magnetic field, a shaft having its ends rigidly fixed to said support, the intermediate portion of said shaft between said ends being capable of rotary movement through a limited arc only, a driving coil connected to said shaft intermediate its ends and disposed in said magnetic field, and a generating coil connected to said shaft and disposed in said magnetic field, said generating coil being disposed at substantially right angles to said driving coil.

13. A frequency selector comprising a support, a member having its ends fixed to said support and having coils mounted thereon intermediate said ends, said member and coils forming an assembly capable of rotary vibratory movement intermediate said fixed ends and having a pre-determined natural frequency of rotary vibration, means for setting up a magnetic field around said coils, and means for supplying alternating current to certain of said coils whereby said assembly will be caused to vibrate in said magnetic field when an alternating current having a frequency approximately equal to said pre-determined natural frequency is supplied to certain of said coils, certain of said coils being adapted to generate a current during said vibratory movement.

14. A frequency selector comprising a support, a member having its ends attached to said support and having energizing and generating coils mounted thereon intermediate said ends, the intermediate portion of said member and said coils constituting an assembly capable of rotary oscillatory movement and having a pre-determined natural frequency of rotary oscillation, means for setting up a magnetic field around said coils, and means for supplying alternating currents to said energizing coils whereby said assembly is caused to assume rotary oscillatory movement when an alternating current having a frequency approximately equal to said pre-determined natural frequency is supplied to said energizing coils, said generating coils being thereby caused to assume rotary oscillatory movement in said magnetic field to produce an alternating current having a frequency equal to that of the alternating current supplied to the energizing coils and an amplitude proportional to the amplitude of said energizing current.

15. A frequency selector comprising a support, a member having its ends attached to said support and having coils mounted thereon intermediate said ends, said member and coils forming an assembly mounted for rotary vibratory movement and having a pre-determined natural frequency of rotary vibration, means for setting up a magnetic field around said coils, and means for supplying alternating current to certain of said coils whereby said assembly will be caused to vibrate in said magnetic field when an alternating current having a frequency approximately equal to said pre-determined natural frequency is supplied to certain of said coils, certain of said coils being adapted to generate a current during such vibratory movement.

16. A frequency selector comprising a support, a shaft having its ends attached to said support, means for causing rotary oscillatory movement of said shaft, means associated with said shaft for generating an alternating current during said rotary oscillatory movement thereof, means for preventing rotary movement of said shaft through more than a limited arc, and means carried by said shaft for adjusting the rotary inertia thereof.

17. A frequency selector comprising a support, a shaft having its ends attached to said support, means for causing rotary oscillatory movement of said shaft, means for preventing rotary movement of said shaft through more than a limited arc, means associated with said shaft and operable to generate an alternating current during rotary oscillatory movement thereof, and means for preventing radial vibrations of said shaft.

18. A frequency selector comprising a support, means associated with said support for setting up a magnetic field, a shaft having its ends attached to said support, means connected to said shaft and disposed in said magnetic field for causing rotary oscillatory movement of said shaft, means for preventing rotary movement of said shaft through more than a limited arc, means connected to said shaft for generating a current during said rotary oscillatory movement, and means for preventing radial vibrations of said shaft.

19. A frequency selector comprising a support, means associated with said support for setting up a magnetic field, a shaft having its ends attached to said support, the intermediate portion of said shaft being capable of rotary movement through a limited arc only, means connected to said shaft and disposed in said magnetic field for causing limited rotary movement of said shaft, means connected to said shaft for generating a current during said limited rotary movement, and means carried by said shaft for adjusting the rotary inertia thereof.

20. A frequency selector comprising a support, a shaft having its ends rigidly connected to said support, a plurality of magnets carried by said support, a core member surrounding said shaft, a driving coil and a generating coil each attached to said shaft and surrounding said core and disposed in the fields of said magnets, brackets carried by said support and having portions surrounding said shaft, and a plurality of screw-threaded shafts extending radially from said shaft and having nuts screw-threaded thereon.

21. A frequency selector comprising a support, means associated with said support for setting up a magnetic field, a shaft having its ends rigidly attached to said support, the intermediate portion of said shaft being capable of rotary movement through a limited arc only, a driving coil connected to said shaft intermediate the ends thereof and disposed in said magnetic field, a generating coil connected to said shaft intermediate the ends thereof and disposed in said magnetic field, and means attached to said support and surrounding said shaft adjacent the ends thereof for preventing translatory vibrations of said shaft.

GOMER L. DAVIES.